United States Patent
Zhang (10) Patent No.: US 9,882,794 B2
(45) Date of Patent: Jan. 30, 2018

(54) METHOD, MEDIA TYPE SERVER AND TERMINAL DEVICE FOR IDENTIFYING SERVICE REQUEST TYPE

(71) Applicant: HUAWEI TECHNOLOGIES CO., LTD., Shenzhen (CN)

(72) Inventor: Yu Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 14/132,922

(22) Filed: Dec. 18, 2013

(65) Prior Publication Data

US 2014/0108654 A1  Apr. 17, 2014

Related U.S. Application Data

(63) Continuation of application No. PCT/CN2011/081085, filed on Oct. 21, 2011.

(51) Int. Cl.
 *H04L 12/26* (2006.01)
 *H04L 29/06* (2006.01)

(52) U.S. Cl.
 CPC .......... *H04L 43/08* (2013.01); *H04L 65/1069* (2013.01); *H04L 65/4084* (2013.01)

(58) Field of Classification Search
 CPC .. H04L 43/08; H04L 65/1069; H04L 65/4084
 See application file for complete search history.

(56) References Cited

U.S. PATENT DOCUMENTS

| | | | |
|---|---|---|---|
| 2001/0038609 A1* | 11/2001 | Yamaguchi | H04L 12/2898 370/229 |
| 2004/0158800 A1* | 8/2004 | Jung | G06F 17/3002 715/201 |
| 2006/0277596 A1 | 12/2006 | Calvert et al. | |

(Continued)

FOREIGN PATENT DOCUMENTS

| | | |
|---|---|---|
| CN | 1878170 | 12/2006 |
| CN | 102006298 | 4/2011 |

(Continued)

OTHER PUBLICATIONS

Chinese Office Action and Search Report dated Aug. 17, 2015 in corresponding Chinese Patent Application No. 201180002623.7.

(Continued)

*Primary Examiner* — Arvin Eskandarnia
*Assistant Examiner* — Gil H. Lee
(74) *Attorney, Agent, or Firm* — Staas & Halsey LLP (57) ABSTRACT

A method, media server, and terminal device identifying a service request type. If a service request carries a Cookie with a content identification value and the content identification value of the Cookie with the content identification value is consistent with a media content value corresponding to the service request, the service request is determined as an existing service request; otherwise, the service request is determined as a newly initiated service request, so that the media server can identify which service request is an existing service request, and which service request is a newly initiated service request, and therefore can provide differentiated services for terminal devices.

16 Claims, 8 Drawing Sheets

100 — A media server receives a service request sent by a terminal device

102 — If the service request carries a Cookie with a content identification value and the content identification value of the Cookie with the content identification value is consistent with a media content value corresponding to the service request, determine that the service request is an existing service request; otherwise, determine that the service request is a newly initiated service request (56) References Cited

U.S. PATENT DOCUMENTS

| | | | | |
|---|---|---|---|---|
| 2007/0005768 A1* | 1/2007 | Won | ............... | H04L 65/4084 |
| | | | | 709/225 |
| 2007/0198721 A1* | 8/2007 | Ikawa | ............... | G06Q 30/00 |
| | | | | 709/226 |
| 2009/0138601 A1* | 5/2009 | Hebert | ............... | H04N 7/165 |
| | | | | 709/226 |

FOREIGN PATENT DOCUMENTS

| | | |
|---|---|---|
| CN | 102143150 | 8/2011 |
| CN | 102215213 | 10/2011 |

OTHER PUBLICATIONS

PCT International Search Report and Written Opinion of the International Searching Authority dated Jul. 19, 2012 in corresponding International Patent Application No. PCT/CN2011/081085.

International Search Report dated Jul. 19, 2012 in corresponding International Application No. PCT/CN2011/081085.

\* cited by examiner

METHOD, MEDIA TYPE SERVER AND TERMINAL DEVICE FOR IDENTIFYING SERVICE REQUEST TYPE

CROSS-REFERENCE TO RELATED APPLICATIONS

This application is a continuation of International Application No. PCT/CN2011/081085, filed on Oct. 21, 2011, which is hereby incorporated by reference in its entirety.

TECHNICAL FIELD

Embodiments of the present invention relate to the field of information technologies, and in particular, to a method, a media server, and a terminal device for identifying a service request type.

BACKGROUND

Currently, a media server provides a multimedia service for a terminal device, and a multimedia file is transmitted from the media server to the terminal device mainly in a multimedia streaming transmission manner. Multimedia streaming transmission indicates that a file to be transmitted is segmented into multiple pieces for transmission. Specifically, there are mainly three multimedia streaming transmission manners: progressive streaming transmission (progressive streaming), real-time streaming transmission (real time streaming), and adaptive streaming transmission (adaptive streaming). The progressive streaming transmission refers to downloading media content sequentially, and while a file is downloaded, a user may watch online media content, and at a given moment, the user is only allowed to watch the downloaded media content and cannot jump to watch media content that is not downloaded. The real-time streaming transmission is different from the progressive streaming transmission; during a transmission period of the real time streaming transmission, a media server may transmit selected content according to selection of a terminal. The adaptive streaming transmission is a hybrid transmission manner, and adopts an adaptive transmission mechanism; a media server can determine a rate of media content transmitted to a terminal device according to a constantly changing network condition.

Currently, a media server cannot identify which service request is an existing service request and which service request is a newly initiated service request, and therefore cannot provide differentiated services for terminal devices.

SUMMARY

Embodiments of the present invention provide a method, a media server, and a terminal device for identifying a service request type, so as to solve a problem in the prior art that a media server cannot identify which service request is an existing service request and which service request is a newly initiated service request.

An embodiment of the present invention provides a method for identifying a service request type, including:
receiving, by a media server, a service request sent by a terminal device; and
if the service request carries a Cookie with a content identification value and the content identification value of the Cookie with the content identification value is consistent with a media content value corresponding to the service request, determining that the service request is an existing service request; otherwise, determining that the service request is a newly initiated service request.

An embodiment of the present invention provides a method for sending a service request, including:
sending, by a terminal device, a first service request to a media server;
receiving, by the terminal device, a response message of the media server for the first service request, where the response message carries a Cookie, and the Cookie includes a content identification value of media content corresponding to the service request; and
sending, by the terminal device, a second service request to the media server, where the second service request carries the Cookie, so that the media server identifies a type of the second service request according to the Cookie and/or the content identification value of the Cookie.

An embodiment of the present invention provides a media server, including:
a receiving module, configured to receive a service request sent by a terminal device; and
a determining module, configured to determine that the service request is an existing service request when the service request carries a Cookie with a content identification value and the content identification value of the Cookie with the content identification value is consistent with a media content value corresponding to the service request; and otherwise, determine that the service request is a newly initiated service request.

An embodiment of the present invention provides a terminal device, including:
a sending module, configured to send a first service request and a second service request to a media server, where the second service request is sent after the first service request and carries a Cookie set by the media server, so that the media server identifies a type of the second service request according to the Cookie and/or a content identification value of the Cookie; and
a receiving module, configured to receive a response message of the media server for the first service request, where the response message carries the Cookie set by the media server, and the Cookie includes a content identification value of media content corresponding to the service request.

In the method, media server, and terminal device for identifying a service request type according to the embodiments of the present invention, if a service request carries a Cookie with a content identification value and the content identification value of the Cookie with the content identification value is consistent with a media content value corresponding to the service request, the service request is determined as an existing service request; otherwise, the service request is determined as a newly initiated service request, so that the media server can identify which service request is an existing service request and which service request is a newly initiated service request, and therefore can provide differentiated services for terminal devices.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
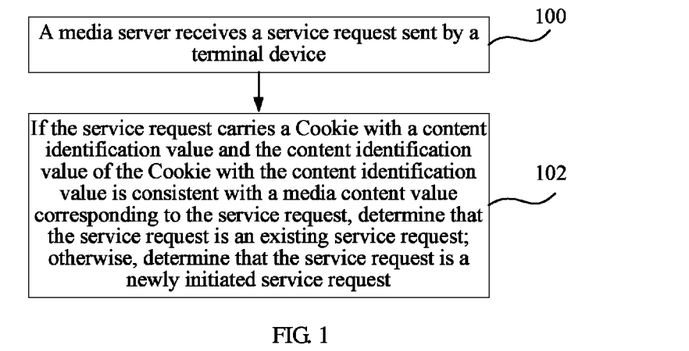
FIG. 1 is a schematic flow chart of a first embodiment of a method for identifying a service request type according to an embodiment of the present invention.

FIG. 1 is a schematic flow chart of a first embodiment of a method for identifying a service request type according to an embodiment of the present invention. As shown in FIG. 1, the method of this embodiment includes:

Step 100: A media server receives a service request sent by a terminal device.

In this embodiment, the media server may be a commercial streaming media server adopting adaptive streaming transmission, such as a Real media server (Real Helix Server), a Microsoft media server (Windows Media Server), an Adobe media server (Adobe Flash Media Server, and may also be a commercial Web server adopting adaptive streaming transmission, such as an Internet information server (Internet Information Server), and may further be an open source Web server adopting adaptive streaming transmission.

In this embodiment, the terminal device is generally disposed in a place where the terminal device can be connected to and work with a remote computer through a communication facility; the terminal device is mainly formed by a communication interface control apparatus and a dedicated or selected input/output apparatus, such as a computer and a mobile phone.

Step 102: If the service request carries a Cookie with a content identification value and the content identification value of the Cookie with the content identification value is consistent with a media content value corresponding to the service request, determine that the service request is an existing service request; otherwise, determine that the service request is a newly initiated service request.

In this embodiment, Cookie is data used for recording information exchange between a server and a terminal device; according to the Cookies standard (RFC2109) put forward by the W3C (World Wide Web Consortium, world wide web consortium) organization, a format of the Cookie is shown in the following table:

| Name = VALUE | Expires = DATE | Path = PATH | Domain = DOMAIN_NAME |
| --- | --- | --- | --- |

Name=VALUE: Name refers to a name of a Cookie, and VALUE is a value of the Cookie; the Cookie name and value are necessary parts of each Cookie, and must appear in a pair.

Expires=DATE: Expires determines a validity period of the Cookie, and an attribute value DATE of the Expires must be written in a specific format, for example, day of the week, DD-MM-YY HH:MM:SS GMT, where GMT indicates Greenwich Mean Time.

Domain=DOMAIN NAME: Domain determines which servers may read the Cookie, that is, only pages from this domain may use information in the Cookie.

Path=PATH: A Path attribute defines pages under which paths on the server may acquire the Cookie set by the server.

Based on the foregoing definitions, the scope for accessing the Cookie is effectively controlled by setting two variables, that is, Domain and Path.

Figure 2A:
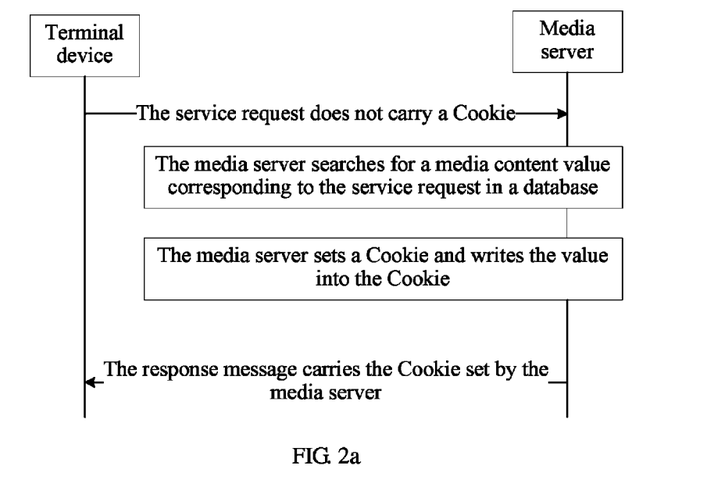
FIG. 2a and FIG. 2b and FIG. 2c are a schematic flow chart of setting a content identification value of a Cookie in a first method embodiment according to an embodiment of the present invention.
Figure 2B:
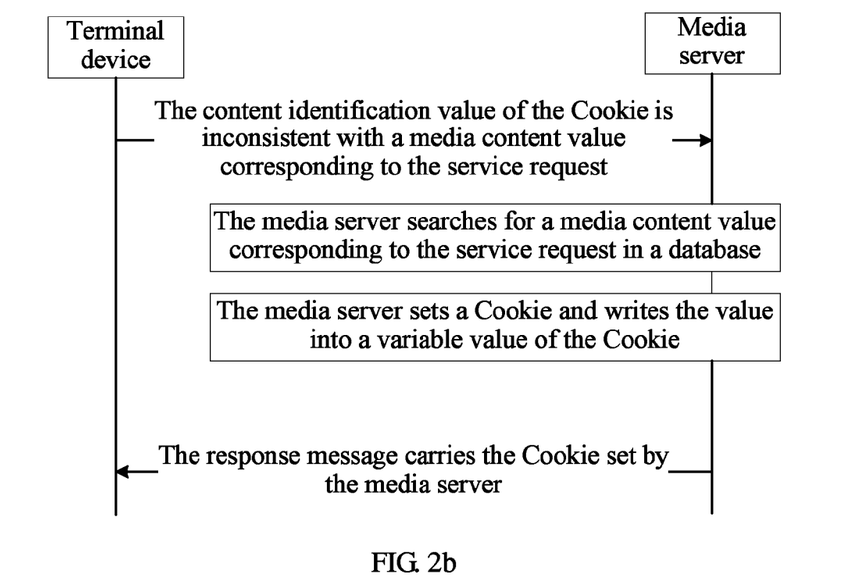
Figure 2C:
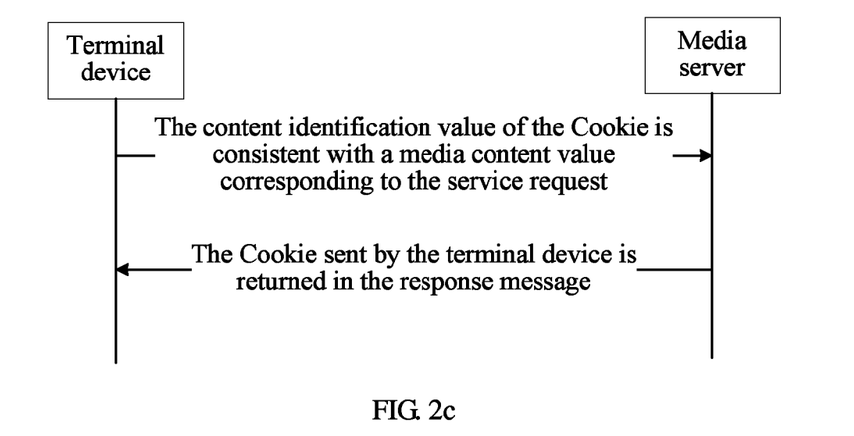

In this embodiment, the content identification value of the Cookie is used for identifying media content corresponding to the service request; in this embodiment, a process of setting the content identification value of the Cookie is shown in FIG. 2a and FIG. 2b and FIG. 2c.

The process of setting the content identification value of the Cookie is classified into three situations:

Situation 1. As shown in FIG. 2a, the media server receives a service request sent by the terminal device; if the service request does not carry a Cookie, the media server searches for a media content value corresponding to the service request from a database according to the service request. The database stores a correspondence table between media content and media content values, and the database may be a database of the media server, and may also be another database that can be called by the media server.

The media server sets a Cookie for the service request, and may set the name of the Cookie to "content" and use a media content value corresponding to the service request as the value of "content", for example, Set Cookie: (content=media content value).

Then, the media server returns a response message to the terminal device, where the response message carries the Cookie set by the media server for the service request.

Specifically, for example, the media server receives a service request sent by the terminal device, where the service request requests playing movie C on demand, and partial content of the service request is as follows:

Http request: (sending a request through an Http protocol)
GET/cluster/Movies/movie C/FragmentInfo (video=2000000)/
QualityLevels(991000) HTTP/1.1 (requesting an address of movie C)
Accept-Language: zh-cn (language accepted by the terminal device: Chinese)

If the service request does not carry a Cookie, and the media server finds, by searching the correspondence table in the database, that the media content value corresponding to movie C is 00110011, the response message returned by the media server may carry the following response message, where partial content of the response message is as follows:

Http response: (responding through an Http protocol)
HTTP/1.1 200 OK (approving the request)
Server: media server information (returning information of the media server)
Set-Cookie: content=00110011; Path=/cluster;
Domain=media server domain name; Expires=validity period (setting the Cookie)

Through the foregoing response message, the media server may set one cookie for the terminal device; after receiving the response message, the terminal device stores the cookie.

Situation 2. As shown in FIG. 2b, the media server receives a service request sent by the terminal device; if the service request carries a Cookie with a content identification value, the media server reads the content identification value of the Cookie; the media server searches for a media content value corresponding to the service request in a database according to the service request, and compares the content identification value of the Cookie with the media content value corresponding to the service request; if the content identification value of the Cookie is inconsistent with the media content value corresponding to the service request, the media server writes the media content value corresponding to the service request into the content identification value of the Cookie. The media content value corresponding to the service request may be written into the content identification value of the Cookie in the following manners:

First, the media server writes the media content value corresponding to the service request into the Cookie as a current Cookie value, and then returns a response message to the terminal device; the response message carries the Cookie, and an original Cookie stored on the terminal device is covered.

Second, the media server first deletes the current Cookie, then resets a Cookie, uses the media content value corresponding to the service request as a value of the Cookie, and then returns a response message to the terminal device, where the response message carries two Cookies; for example, the response message may carry:

Set-Cookie: Content=Deleted; Domain=media.foo.com;
Set-Cookie: Content=00011111; Domain=media.foo.com;

where "00011111" is a media content value corresponding to the current service request.

The terminal device receives the response message returned by the media server, deletes the current Cookie, and stores the Cookie reset by the media server.

Situation 3. As shown in FIG. 2c, the media server receives a service request sent by the terminal device; if the service request carries a Cookie with a content identification value and the content identification value of the Cookie with the content identification value is consistent with a media content value corresponding to the service request, the media server returns a response message to the terminal device without changing the content identification value of the Cookie.

In this embodiment, the database stores a correspondence table between media content and media content values, which is to be queried and used by the media server; the correspondence table may be set in advance and saved in the database. The media content value may be set in advance according to the media content and stored in the correspondence table, and used for identifying data of the media content.

For example, if the media server provides media content A, B, and C, a correspondence table between the media content and media content values is set, which is shown as follows:

| Media content A | Media content B | Media content C |
|---|---|---|
| 00001111 | 00000111 | 00000011 |

In the foregoing correspondence table, the three numeric values are corresponding to the media content A, B, and C, respectively; the value 00001111 is used for identifying media content A, the value 00000111 is used for identifying media content B, and the value 00000011 is used for identifying media content C; the correspondence table is stored in the database, and is to be queried and used by the media server.

In this embodiment, the media server may receive multiple service requests at the same time, and the media server may identify a type of each service request respectively.

In this embodiment, if the service request carries a Cookie with a content identification value and the content identification value of the Cookie with the content identification value is consistent with a media content value corresponding to the service request, the service request is determined as an existing service request; otherwise, the service request is determined as a newly initiated service request, thereby solving a problem in the prior art that a media server cannot identify which service request is an existing service request and which service request is a newly initiated service request, so that the media server can provide differentiated services for terminal devices according to the type of the service request.

The embodiment of the present invention may further include: when service requests received by the media server exceed a concurrent number threshold value preset by the media server at a certain moment or during a certain period, or when a memory, a processor or a thread of the media server is overloaded, for example, cannot satisfy a current demand of the service request, performing, by the media server, flow control processing according to the type of the service request.

The specific flow control processing manner may be as follows:

When the media server is overloaded, as for the existing service request, the media server continues to provide a service for the existing service request or transfers the existing service request to another media server that is not overloaded; as for the newly initiated service request, the media server rejects providing a service for the newly initiated service request. When the media server is overloaded, flow control processing is performed on the service request, which can avoid increasing response time of the media server, and at the same time provide differentiated services for terminal devices.

The transferring the existing service request to another media server that is not overloaded may be implemented in a manner of redirection, which may specifically include the following manners: first, redirection based on a domain name system (Domain Name System, DNS); second, redirection based on network proximity determination and wide area triangle; and third, redirection based on a real time streaming protocol (Real Time Streaming Protocol, RTSP), a Microsoft media server protocol (Microsoft Media Server Protocol, MMS) or a hyper Text transfer protocol (Hyper Text Transfer Protocol, HTTP) at an application layer.

Figure 3:
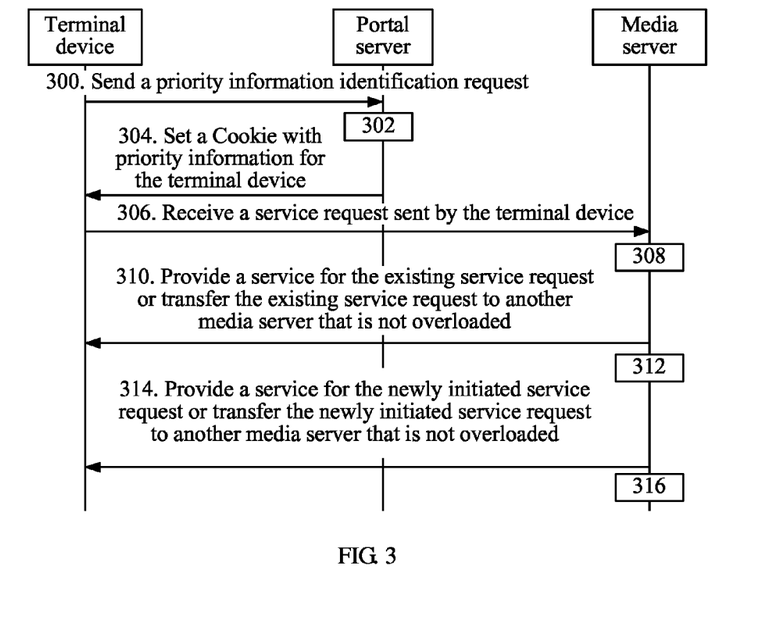
FIG. 3 is a schematic signaling flow chart of a second embodiment of a method for identifying a service request type according to an embodiment of the present invention.

FIG. 3 is a schematic flow chart of a second embodiment of a method for identifying a service request type according to an embodiment of the present invention; as shown in FIG. 3, the method of this embodiment includes:

Step 300: A terminal device sends a priority information identification request to a server with a priority information identification function.

In this embodiment, the server with the priority information identification function may be a portal server.

Step 302: The server with the priority information identification function identifies priority information of the terminal device; if the terminal device has the priority information, proceed to step 304; if the terminal device does not have the priority information, proceed to step 306.

For example, the portal server receives a priority information identification request sent by a terminal device, and the portal server identifies priority information of the terminal device through an authentication/accounting server; if the terminal device has the priority information, the portal server sets a Cookie with priority information for the terminal device, writes a priority information value corresponding to the priority information into the Cookie, and at the same time, sets a domain name of the Cookie with the priority information to a domain name of the media server, for example Set Cookie: (priority, priority information value); Cookie.set Domain ("media server".com). The domain name of the Cookie is set to the domain name of the media server, so that the Cookie can be carried in the service request sent by the media server.

Then, the portal server returns a response message to the terminal device, where the response message carries the Cookie with the priority information, and the terminal device receives and stores the Cookie with the priority information. When the terminal device sends a service request to the media server, the service request carries the Cookie with the priority information, where the Cookie is used to inform the media server that the terminal device has the priority information.

The portal server receives the priority information identification request sent by the terminal device, and the portal server identifies the priority information of the terminal device through an authentication/accounting server; if the terminal device does not have the priority information, a Cookie with priority information is not set.

Step 304: The server with the priority information identification function sets a Cookie with priority information for the terminal device.

Step 306: The media server receives a service request sent by the terminal device.

Step 308: If the service request carries a Cookie with a content identification value and the content identification value of the Cookie with the content identification value is consistent with a media content value corresponding to the service request, determine that the service request is an existing service request; otherwise, determine that the service request is a newly initiated service request.

The foregoing content identification value of the Cookie and the media content value corresponding to the service request have been described in the first embodiment, and are not described in this embodiment again.

Step 310: When the media server is overloaded, as for the existing service request, the media server continues to provide a service for the existing service request or transfers the existing service request to another media server that is not overloaded.

The transferring the existing service request to another media server that is not overloaded has been described in the first embodiment, and is not described in this embodiment again.

Step 312: As for the newly initiated service request, determine whether the newly initiated service request carries a Cookie with priority information; if the newly initiated service request carries a Cookie with priority information, execute step 314; otherwise, execute step 316.

Step 314: Provide a service for the newly initiated service request or transfer the newly initiated service request to another media server that is not overloaded.

Step 316: Reject providing a service for the newly initiated service request.

In the embodiment of the present invention, the server with the priority information identification function identifies priority information of the terminal device, and sets a Cookie with priority information for the terminal device with priority information, so that the media server can identify the priority information of the terminal device according to the Cookie with the priority information; when the media server is overloaded, services are provided for terminal devices with priority information, thereby providing differentiated services for terminal devices.

The technical solution of the present invention may be implemented in various network architectures. A CDN network architecture is taken as an example for description in the following.

The network architecture of a CDN mainly includes: a content origin storage function (Content Origin Function; abbreviated as COF) apparatus, a content delivery network control function (Content Delivery Network Control Function; abbreviated as CDNCF) apparatus, at least one content delivery function (Content Delivery Function, abbreviated as CDF) apparatus, and at least one cluster control function (Cluster Controller Function, abbreviated as CCF) apparatus. The COF apparatus is configured to acquire media content from a content provider; the CDNCF apparatus and the CCF apparatus are configured to select a CDF apparatus that finally provides services for a user; and the CDF apparatus is used for content edge buffering and content streaming and delivery for a terminal device.

Figure 4:
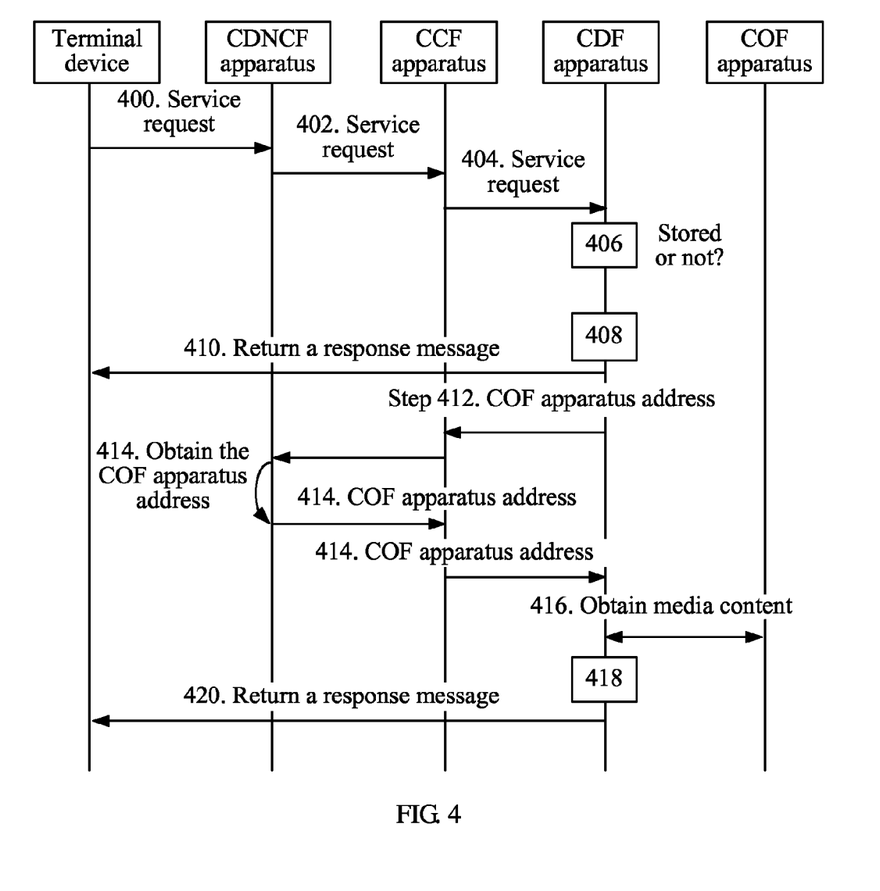
FIG. 4 is a schematic signaling flow chart of a third embodiment of a method for identifying a service request type according to an embodiment of the present invention.

FIG. 4 is a schematic signaling flow chart of a third embodiment of a method for identifying a service request type according to an embodiment of the present invention. In this embodiment, the media server may be a streaming server (Streaming Server) in the CDN network architecture, and specifically may be a CDF apparatus.

As shown in FIG. 4, the method includes the following steps.

Step 400: A CDNCF apparatus receives a service request sent by a terminal device, and forwards the service request sent by the terminal device to a CCF apparatus.

Step 402: The CCF apparatus selects a CDF apparatus according to a preset routing policy, and forwards the service request to the CDF apparatus.

Step 404: The CDF apparatus receives the service request sent by the terminal device and forwarded by the CCF apparatus.

Step 406: The CDF apparatus determines whether media content corresponding to the service request of the terminal device is buffered; if not, execute step 412 to step 420; and if yes, execute step 408 and step 410.

Step 408: The CDF apparatus identifies a type of the service request sent by the terminal device.

In this embodiment, that the CDF apparatus identifying a type of the service request sent by the terminal device may be that: If the service request carries a Cookie with a content identification value and the content identification value of the Cookie with the content identification value is consistent with a media content value corresponding to the service request, the CDF apparatus determines that the service request is an existing service request; otherwise, the CDF apparatus determines that the service request is a newly initiated service request.

In this embodiment, when the CDF apparatus determines that the service request is not an existing service request, the determining that the service request is a newly initiated service request may include at least one of the following manners:

manner 1: if the service request does not carry a Cookie, determining that the service request is a newly initiated service request;

manner 2: if the service request carries a Cookie and the service request does not carry a Cookie with a content identification value, determining that the service request is a newly initiated service request; and manner 3: if the service request carries a Cookie with a content identification value and the content identification value of Cookie with the content identification value is inconsistent with a media content value corresponding to the service request, determining that the service request is a newly initiated service request.

Step 410: The CDF apparatus returns a response message to the terminal device.

In this embodiment, the CDF apparatus may return a response message to the terminal device in three manners:

If the service request sent by the terminal device does not carry a Cookie, the CDF apparatus searches for a media content value corresponding to the service request from a database; the CDF apparatus sets a Cookie for the service request, and writes the media content value into the Cookie; the Cookie is carried in the response message returned by the CDF apparatus to the terminal device.

If the service request sent by the terminal device carries a Cookie with a content identification value, and the content identification value of the Cookie is inconsistent with a media content value corresponding to the service request, the CDF apparatus searches for a media content value corresponding to the service request from a database; and the CDF apparatus writes the media content value corresponding to the service request into the content identification value of the Cookie.

A manner for writing the media content value corresponding to the service request into the content identification value of the Cookie has been described in the first embodiment, and is not described in this embodiment again.

If the service request sent by the terminal device carries a Cookie with a content identification value, and the content identification value of the Cookie is consistent with a media content value corresponding to the service request, the CDF apparatus does not change the content identification value of the Cookie; and the CDF apparatus returns the response message to the terminal device.

In this embodiment, the manner for setting a Cookie with a content identification value has been described in the first embodiment, and is not described in this embodiment again.

Step 412: The CDF apparatus sends an address request to the CCF apparatus, and the CCF apparatus forwards the address request to the CDNCF apparatus, where the address request includes media content information requested by the terminal device.

Step 414: The CDNCF apparatus searches pre-stored correspondence between media content information and COF apparatus addresses to obtain a COF apparatus address corresponding to the media content information in the address request, and the CCF apparatus forwards the COF apparatus address to the CDF apparatus.

Step 416: The CDF apparatus establishes connection with a COF apparatus corresponding to the COF apparatus address, acquires media content corresponding to the media content information, and reports a message indicating that the media content is acquired to the CCF apparatus.

Step 418: The CDF apparatus identifies a type of the service request sent by the terminal device.

A specific method for a CDF apparatus to identify a type of the service request sent by the terminal device has been described in step 408, and is not described again in this step.

Step 420: The CDF apparatus returns a response message to the terminal device.

A specific manner for the CDF apparatus to return a response message to the terminal device has been described in step 410, and is not described again in this step.

The embodiment of the present invention may further include: When the media server is overloaded, as for the existing service request, continuing to provide a service for the existing service request or transferring the existing service request to another media server that is not overloaded; and as for the newly initiated service request, rejecting providing a service for the newly initiated service request. By means of the technical solution of the present invention, an increase in response time of the media server is avoided, and at the same time, differentiated services may also be provided for terminal devices.

A manner for transferring the existing service request to another media server that is not overloaded has been described in the first embodiment, and is not described again in this embodiment.

Figure 5:
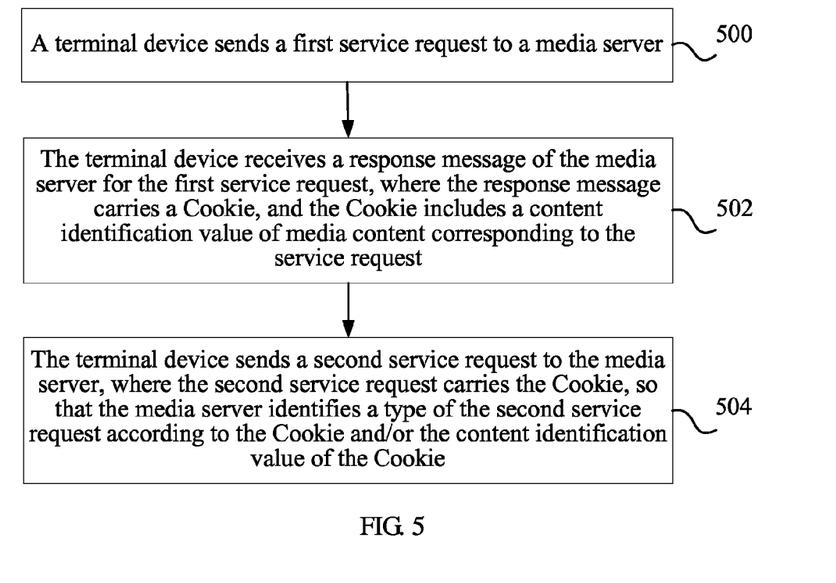
FIG. 5 is a schematic signaling flow chart of a fourth embodiment of a method for identifying a service request type according to an embodiment of the present invention.

FIG. 5 is a schematic signaling flow chart of a fourth embodiment of a method for identifying a service request type according to an embodiment of the present invention. As shown in FIG. 5, the method of this embodiment includes:

Step 500: A terminal device sends a first service request to a media server.

The terminal device and the media server have been described in the first embodiment, and are not described again in this embodiment.

Step 502: The terminal device receives a response message of the media server for the first service request, where the response message carries a Cookie, and the Cookie includes a content identification value of media content corresponding to the service request.

The Cookie and the content identification value corresponding to the media content have been described in the first embodiment, and are not described again in this embodiment.

Step 504: The terminal device sends a second service request to the media server, where the second service request carries the Cookie, so that the media server identifies a type of the second service request according to the Cookie and/or the content identification value of the Cookie.

In this embodiment, the content identification value of the Cookie and a manner for setting the content identification value of the Cookie have been described in the first embodiment, and are not described again in this embodiment.

In this embodiment, a specific method for the media server to identify a type of the second service request according to the Cookie and/or the content identification value of the Cookie has been described in step 408 of the third embodiment, and is not described again in this embodiment.

By means of the method in this embodiment, the media server can identify which service request is an existing service request, and which service request is a newly initiated service request, and therefore can provide differentiated services for terminal devices.

Figure 6:
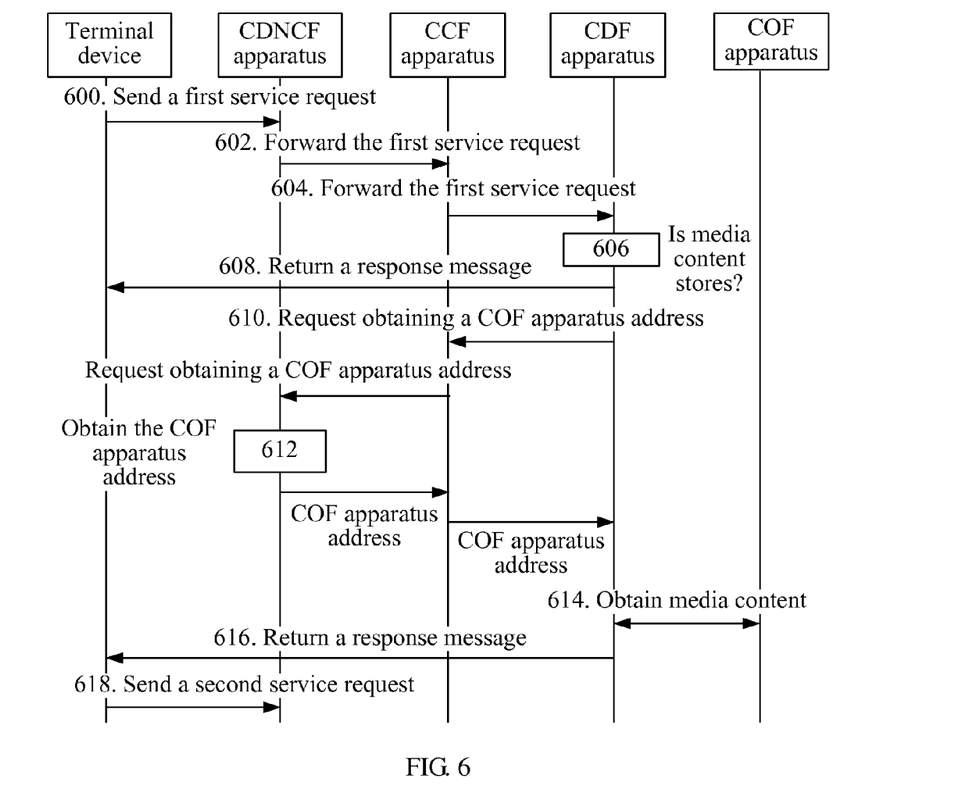
FIG. 6 is a schematic signaling flow chart of a fifth embodiment of a method for identifying a service request type according to an embodiment of the present invention.

The embodiment of the present invention may also be implemented in the CDN network architecture. FIG. 6 is a schematic signaling flow chart of a fifth embodiment of a method for identifying a service request type according to an embodiment of the present invention. As shown in FIG. 6, the method includes:

Step 600: A terminal device sends a first service request to a CDNCF apparatus.

Step 602: The CDNCF apparatus receives the first service request sent by the terminal device, and forwards the first service request sent by the terminal device to a CCF apparatus.

Step 604: The CCF apparatus selects a CDF apparatus according to a preset routing policy, and forwards the first service request to the CDF apparatus.

Step 606: The CDF apparatus receives the first service request sent by the terminal device and forwarded by the CCF apparatus; the CDF apparatus determines whether media content corresponding to the first service request sent by the terminal device is stored; if not, execute step 610 to step 618; and if yes, execute step 608 and step 618.

Step 608: The terminal device receives a response message of the CDF apparatus for the first service request.

In this embodiment, that the terminal device receiving a response message of the CDF apparatus for the first service request includes three situations:

First, if the first service request sent by the terminal device does not carry a Cookie, the CDF apparatus searches for a media content value corresponding to the first service request from a database; the CDF apparatus sets a Cookie for the service request, and writes the media content value into the Cookie; the response message returned by the CDF apparatus to the terminal device carries the Cookie.

Second, if the first service request sent by the terminal device carries a Cookie with a content identification value and the content identification value of the Cookie is inconsistent with a media content value corresponding to the first service request, the CDF apparatus searches for a media content value corresponding to the first service request from a database; the CDF apparatus writes the media content value corresponding to the first service request into the content identification value of the Cookie.

In this embodiment, a manner for writing the media content value corresponding to the service request into the content identification value of the Cookie has been described in the first embodiment, and is not described again in this embodiment.

Third, if the first service request sent by the terminal device carries a Cookie with a content identification value and the content identification value of the Cookie is consistent with a media content value corresponding to the first service request, the CDF apparatus does not change the content identification value of the Cookie; and the CDF apparatus returns a response message to the terminal device.

In this embodiment, a manner for setting a Cookie and a manner for writing the media content value corresponding to the service request into the Cookie have been described in the first embodiment, and are not described again in this embodiment.

Step 610: The CDF apparatus sends an address request to the CCF apparatus, and the CCF apparatus forwards the address request to the CDNCF apparatus, where the address request includes media content information requested by the terminal device.

Step 612: The CDNCF apparatus searches pre-stored correspondence between media content information and COF apparatus addresses to obtain a COF apparatus address corresponding to the media content information in the address request, and the CCF apparatus forwards the COF apparatus address to the CDF apparatus.

Step 614: The CDF apparatus establishes connection with a COF apparatus corresponding to the COF apparatus address, and acquires media content corresponding to the media content information.

Step 616: The terminal device receives a response message of the CDF apparatus for the first service request.

In this embodiment, that the terminal device receiving a response message of the CDF apparatus for the first service request includes three situations:

The three situations have been described in step 608 of this embodiment, and are not described again in step 616 of this embodiment.

Step 618: The terminal device sends a second service request to the CDNCF apparatus.

In this embodiment, the terminal device sends a second service request to the CDNCF apparatus, where the second service request carries a Cookie, so that the media server identifies a type of the second service request according to the Cookie and/or the content identification value of the Cookie.

In this embodiment, to enable the media server to identify a type of the second service request according to the Cookie and/or the content identification value of the Cookie specifically includes: If the second service request carries a Cookie with a content identification value and the content identification value of the Cookie with the content identification value is consistent with a media content value corresponding to the service request, the CDF apparatus determines that the second service request is an existing service request; otherwise, the CDF apparatus determines that the second service request is a newly initiated service request.

In this embodiment, when the CDF apparatus determines that the service request is not an existing service request, the determining that the service request is a newly initiated service request may include at least one of the following manners:

manner 1: if the second service request does not carry a Cookie, determining that the second service request is a newly initiated service request;

manner 2: if the second service request carries a Cookie and the second service request does not carry a Cookie with a content identification value, determining that the second service request is a newly initiated service request; and manner 3: if the second service request carries a Cookie with a content identification value and the content identification value of Cookie with the content identification value is inconsistent with a media content value corresponding to the second service request, determining that the second service request is a newly initiated service request.

Figure 7:
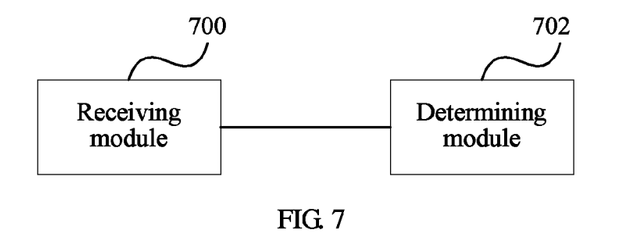
FIG. 7 is a schematic structural diagram of a first embodiment of a media server according to an embodiment of the present invention.

FIG. 7 is a schematic structural diagram of a first embodiment of a media server according to an embodiment of the present invention. As shown in FIG. 7, the media server includes: a receiving module 700 and a determining module 702.

The receiving module 700 is configured to receive a service request sent by a terminal device; the determining module 702 is connected with the receiving module 700, and is configured to determine that the service request is an existing service request when the service request carries a Cookie with a content identification value and the content identification value of the Cookie with the content identification value is consistent with a media content value corresponding to the service request, and otherwise, determine that the service request is a newly initiated service request.

Figure 8:
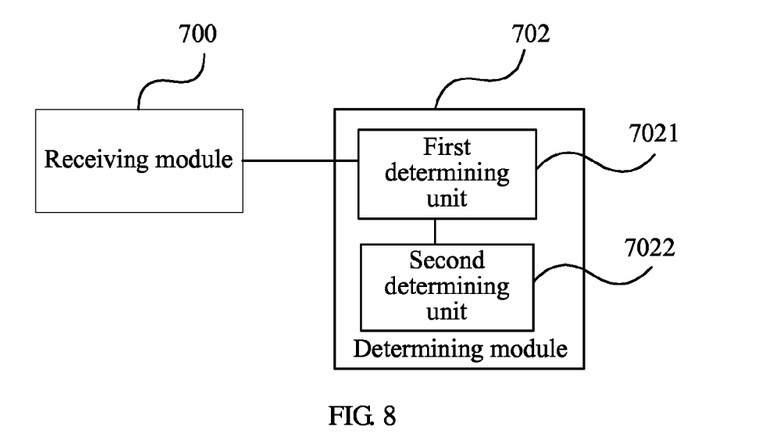
FIG. 8 is a schematic structural diagram of a second embodiment of a media server according to an embodiment of the present invention.

FIG. 8 is a schematic structural diagram of a second embodiment of a media server according to an embodiment of the present invention. As shown in FIG. 8, a determining module 702 of the media server may include a first determining unit 7021 or a second determining unit 7022; the first determining unit 7021 is connected with a receiving module 700, and the second determining unit 7022 is connected with the first determining unit 7021.

The first determining unit 7021 is configured to determine that the service request is an existing service request when the service request carries a Cookie with a content identification value and the content identification value of the Cookie with the content identification value is consistent with a media content value corresponding to the service request.

The second determining unit 7022 is configured to determine that the service request is a newly initiated service request when the first determining unit 7021 determines that the service request is not an existing service request.

In specific implementation, the determining, by the second determining unit 7022, that the service request is a newly initiated service request includes at least one of the following manners:

manner 1: if the service request does not carry a Cookie, determining that the service request is a newly initiated service request;

manner 2: if the service request carries a Cookie and the service request does not carry a Cookie with a content identification value, determining that the service request is a newly initiated service request; and manner 3: if the service request carries a Cookie with a content identification value and the content identification value of Cookie with the content identification value is inconsistent with a media content value corresponding to the service request, determining that the service request is a newly initiated service request.

Figure 9:
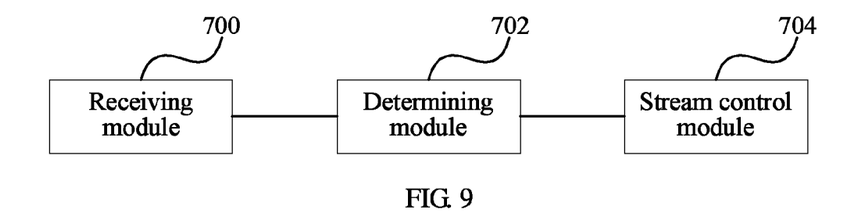
FIG. 9 is a schematic structural diagram of a third embodiment of a media server according to an embodiment of the present invention.

Further, based on the embodiment shown in FIG. 7, the media server further includes: a stream control module 704, and as shown in FIG. 9, the stream control module 704 is connected with the determining module 702.

The stream control module 704 is configured to, when the media server is overloaded, as for the existing service request, continue to provide a service for the existing service request or transfer the existing service request to another media server that is not overloaded; and as for the newly initiated service request, reject providing a service for the newly initiated service request, thereby controlling access of service requests when the media server is overloaded, and avoiding an increase in response time of the media server resulting from deterioration of an overload situation of the media server.

The rejecting, by the stream control module 704, providing a service for the newly initiated service request may include:

when the newly initiated service request carries a Cookie with priority information, providing a service for the newly initiated service request or transferring the newly initiated service request to another media server that is not overloaded; and when the newly initiated service request does not carry a Cookie with priority information, rejecting providing a service for the newly initiated service request.

The apparatus provided by the embodiment of the present invention can provide a different access service for a terminal device when being overloaded based on a type of the service request sent by the terminal device and whether the service request carries a Cookie with priority information, thereby providing differentiated services for terminal devices.

In this embodiment, a method for transferring the service request to another media server that is not overloaded has been described in the first embodiment and is not described again in this embodiment.

Figure 10:
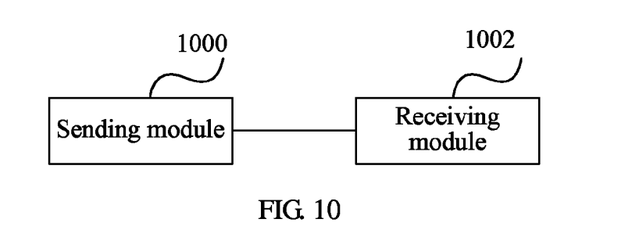
FIG. 10 is a schematic structural diagram of a first embodiment of a terminal device according to an embodiment of the present invention.

FIG. 10 is a schematic structural diagram of a terminal device according to an embodiment of the present invention. As shown in FIG. 10, the terminal device includes: a sending module 1000 and a receiving module 1002. The sending module 1000 is configured to send a first service request and a second service request to a media server, where the second service request is sent after the first service request and carries a Cookie set by the media server, so that the media server identifies a type of the second service request according to the Cookie and/or a content identification value of the Cookie.

The receiving module 1002 is connected to the sending module 1000. The receiving module 1002 is configured to receive a response message of the media server for the first service request, where the response message carries the Cookie set by the media server, and the Cookie includes a content identification value of media content corresponding to the service request.

Figure 11:
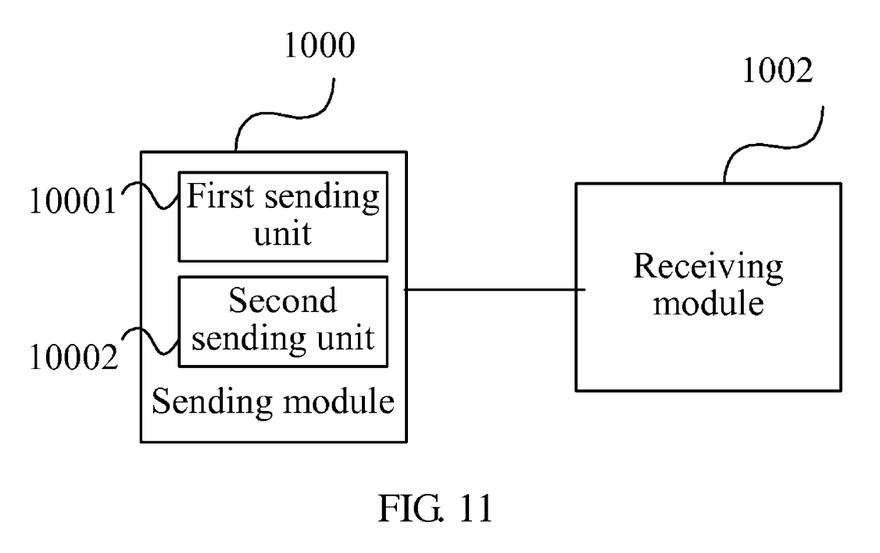
FIG. 11 is a schematic structural diagram of a second embodiment of a terminal device according to an embodiment of the present invention.

Further, as shown in FIG. 11, based on the embodiment shown in FIG. 10, the sending module 1000 of the terminal device may include a first sending unit 10001 or a second sending unit 10002.

The first sending unit 10001 is configured to send a first service request to a media server.

The second sending unit 10002 is configured to send a second service request to the media server, where the second service request is sent after the first service request and carries a Cookie set by the media server, so that the media server identifies a type of the second service request according to the Cookie and/or a content identification value of the Cookie.

In this embodiment, a specific method for the media server to identify a type of the second service request according to the Cookie and/or the content identification value of the Cookie has been described in the third embodiment, and is not described again in this embodiment. Through the apparatus provided by the embodiment of the present invention, the media server can identify which service request is an existing service request, and which service request is a newly initiated service request, and therefore can provide differentiated services for terminal devices.

A person of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The storage medium includes various mediums capable of storing program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions recorded in the foregoing embodiments, or make equivalent replacements to part of technical features of the technical solutions recorded in the foregoing embodiments, however, these modifications or replacements do not make the essence of the corresponding technical solutions depart from the spirit and scope of the technical solutions of the embodiments of the present invention.

What is claimed is:

1. A method for providing differentiated services to terminal devices, comprising:
    receiving, by a media server, a service request sent by a terminal device;
    if the service request carries a Cookie with a content identification value and the content identification value of the Cookie with the content identification value is consistent with a media content value corresponding to the service request, determining that the service request is an existing service request; otherwise, determining that the service request is one of a plurality of newly initiated service requests; and
    performing, by the media server, flow control processing according to the type of the service request,
    wherein the flow control processing comprises:
    when the media server is overloaded, as for the existing service request, continuing to provide a service to the terminal device for the existing service request or transferring the existing service request to another media server that is not overloaded to provide the service to the terminal device; and if the service request is one of the plurality of newly initiated service requests, rejecting providing the service to the terminal device for all of the plurality of newly initiated service requests without regard to a priority of the service request to avoid increasing a response time of the media server, and
    the plurality of newly initiated service requests comprise multiple concurrent service requests that exceed a predetermined threshold.

2. The method according to claim 1, wherein the otherwise, determining that the service request is one of the plurality of newly initiated service requests comprises at least one of the following manners:
    manner 1: if the service request does not carry a Cookie, determining that the service request is one of the plurality of newly initiated service requests;
    manner 2: if the service request carries a Cookie and the service request does not carry a Cookie with a content identification value, determining that the service request is one of the plurality of newly initiated service requests; and
    manner 3: if the service request carries a Cookie with a content identification value and the content identification value of Cookie with the content identification value is inconsistent with a media content value corresponding to the service request, determining that the service request is one of the plurality of newly initiated service requests.

3. The method according to claim 1, wherein
    the content identification value of the Cookie is set before the media server receives the service request, and is used for recording media content corresponding to the service request of the terminal device.

4. The method according to claim 1, wherein:
    the Cookie is data used for recording information exchange between the server and the terminal device.

5. The method according to claim 1, wherein the decision to reject providing the service for all of the plurality of newly initiated service requests depends on whether the service request is one of the plurality of newly initiated service requests.

6. A method for providing differentiated services to terminal devices, comprising:
    sending, by a terminal device, a first service request to a media server;
    receiving, by the terminal device, a response message of the media server for the first service request, wherein the response message carries a Cookie, and the Cookie comprises a content identification value of media content corresponding to the service request;
    sending, by the terminal device, a second service request to the media server, wherein the second service request carries the Cookie, so that the media server identifies a type of the second service request according to the Cookie and/or the content identification value of the Cookie; and
    performing, by the media server, flow control processing according to the type of the service request,
    wherein the flow control processing comprises:
    when the media server is overloaded, and if the type of the second service request is one of a plurality of newly initiated service requests, rejecting providing a service to the terminal device for all of the plurality of newly initiated service requests without regard to a priority of the service request to avoid increasing a response time of the media server, and
    the plurality of newly initiated service requests comprise multiple concurrent service requests that exceed a predetermined threshold.

7. The method according to claim 6, wherein
    the content identification value of the Cookie is set when the media server receives the first service request, and is used for recording media content corresponding to the service request of the terminal device; and
    the Cookie is data used for recording information exchange between the server and the terminal device.

8. A media server for providing differentiated services to terminal devices, comprising:
    a receiver, configured to receive a service request sent by a terminal device;
    a determiner, configured to determine that the service request is an existing service request when the service request carries a Cookie with a content identification value and the content identification value of the Cookie with the content identification value is consistent with a media content value corresponding to the service request; and otherwise, determine that the service request is one of a plurality of newly initiated service requests; and a flow control processor configured to perform, by the media server, flow control processing according to the type of the service request, wherein the flow control processor is configured to: when the media server is overloaded, as for the existing service request, continuing to provide a service to the terminal device for the existing service request or transferring the existing service request to another media server that is not overloaded to provide the service to the terminal device; and if the service request is the one of the plurality of newly initiated service requests, rejecting providing the service to the terminal device for all of the plurality of newly initiated service requests without regard to a priority of the service request to avoid increasing a response time of the media server, and the plurality of newly initiated service requests comprise multiple concurrent service requests that exceed a predetermined threshold.

9. The media server according to claim 8, wherein the determiner comprises:

a first determiner, configured to determine that the service request is an existing service request when the service request carries a Cookie with a content identification value and the content identification value of the Cookie with the content identification value is consistent with a media content value corresponding to the service request; and a second determiner, configured to determine that the service request is one of the plurality of newly initiated service requests when the first determiner determines that the service request is not an existing service request.

10. The media server according to claim 9, wherein the determining, by the second determiner, that the service request is one of the plurality of newly initiated service requests comprises at least one of the following manners:

manner 1: if the service request does not carry a Cookie, determining that the service request is one of the plurality of newly initiated service requests;

manner 2: if the service request carries a Cookie and the service request does not carry a Cookie with a content identification value, determining that the service request is one of the plurality of newly initiated service requests; and manner 3: if the service request carries a Cookie with a content identification value and the content identification value of Cookie with the content identification value is inconsistent with a media content value corresponding to the service request, determining that the service request is one of the plurality of newly initiated service requests.

11. The media server according to claim 8, wherein the content identification value of the Cookie is set before the media server receives the service request, and is used for recording media content corresponding to the service request of the terminal device; and the Cookie is data used for recording information exchange between the server and the terminal device.

12. A terminal device receiving differentiated services, comprising:

a sender, configured to send a first service request and a second service request to a media server, wherein the second service request is sent after the first service request and carries a Cookie set by the media server, so that the media server identifies a type of the second service request according to the Cookie and/or a content identification value of the Cookie;

a receiver, configured to receive a response message of the media server for the first service request, wherein the response message carries the Cookie set by the media server, and the Cookie comprises a content identification value of media content corresponding to the service request; and performing, by the media server, flow control processing according to the type of the service request, wherein the flow control processing comprises:

when the media server is overloaded, and if the type of the second service request is one of a plurality of newly initiated service requests, rejecting providing a service to the terminal device for all of the plurality of newly initiated service requests without regard to a priority of the service request to avoid increasing a response time of the media server, and the plurality of newly initiated service requests comprise multiple concurrent service requests that exceed a predetermined threshold.

13. The terminal device according to claim 12, wherein the sender comprises:

a first sender, configured to send a first service request to a media server; and a second sender, configured to send a second service request to the media server, wherein the second service request is sent after the first service request and carries a Cookie set by the media server, so that the media server identifies a type of the second service request according to the Cookie and/or a content identification value of the Cookie.

14. The terminal device according to claim 12, wherein the content identification value of the Cookie is set when the media server receives the first service request, and is used for recording media content corresponding to the service request of the terminal device; and the Cookie is data used for recording information exchange between the server and the terminal device.

15. An apparatus for providing differentiated services to terminal devices comprising:

a media server configured to receive a service request sent by a terminal device, and to determine that the service request is an existing service request when the service request carries a Cookie with a content identification value and the content identification value of the Cookie with the content identification value is consistent with a media content value corresponding to the service request; and otherwise, determine that the service request is one of a plurality of newly initiated service requests; and performing, by the media server, flow control processing according to the type of the service request, wherein the flow control processing comprises:

when the media server is overloaded, as for the existing service request, continuing to provide a service to the terminal device for the existing service request or transferring the existing service request to another media server that is not overloaded to provide the service to the terminal device; and if the service request is one of the plurality of newly initiated service requests, rejecting providing the service to the terminal device for all of the plurality of newly initiated service requests without regard to a priority of the service request to avoid increasing a response time of the media server, and the plurality of newly initiated service requests comprise multiple concurrent service requests that exceed a predetermined threshold.

16. An apparatus for providing differentiated services to terminal devices comprising:

a terminal device configured to send a first service request and a second service request to a media server, wherein the second service request is sent after the first service request and carries a Cookie set by the media server, so that the media server identifies a type of the second service request according to the Cookie and/or a content identification value of the Cookie, and to receive a response message of the media server for the first service request, wherein the response message carries the Cookie set by the media server, and the Cookie comprises a content identification value of media content corresponding to the service request; and performing, by the media server, flow control processing according to the type of the service request, wherein the flow control processing comprises:

when the media server is overloaded, and if the type of the second service request is one of a plurality of newly initiated service requests, rejecting providing a service to the terminal device for all of the plurality of newly initiated service requests without regard to a priority of the service request to avoid increasing a response time of the media server, and the plurality of newly initiated service requests comprise multiple concurrent service requests that exceed a predetermined threshold.

* * * * *